United States Patent Office 3,526,782
Patented Sept. 1, 1970

3,526,782
CONDUCTIVE SOLIDS WELDING CIRCUITRY
Peter Dominick Prevett, Melrose, and Theodore Joseph Morin, Needham, Mass., assignors to Industrial Magnetics, Inc., St. Canton, Mass., a corporation of Massachusetts
Filed Apr. 1, 1968, Ser. No. 717,804
Int. Cl. B23k 11/26
U.S. Cl. 307—141     20 Claims

ABSTRACT OF THE DISCLOSURE

System for working conductive solids including a generator circuit, a capacitor circuit and a master control circuit which includes two subcycle control circuits and a steering circuit functioning upon completion of the first subcycle of operation to automatically initiate the second subcycle.

---

This invention relates to circuitry for working solid materials, particularly metals, in which currents can be induced.

Working metals by heating them and then exposing them to forces generated by magnetic fields of high intensity has been known, as discussed in U.S. Pat. No. 3,-258,573, "Welding and Forming Method and Apparatus," granted to joint inventors including one of the present inventors on June 28, 1966.

It is the object of the invention to provide for automatic working of such materials according to a predetermined program of heating and force application steps, with reliability, simplicity, and great flexibility, including the ability to employ successively a multiplicity of subcycles, each characterized by application of heat, application of force, or both.

Figure 2:
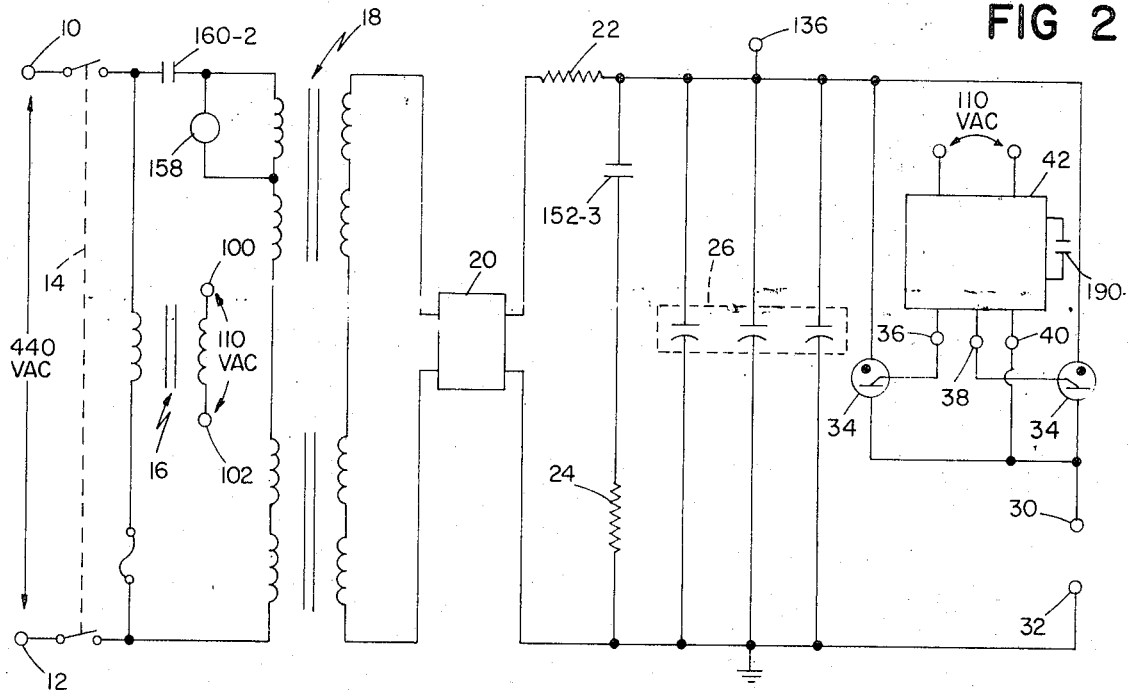
FIG. 2 is a circuit diagram of the capacitor circuit thereof.

Referring first to FIG. 2, there are shown terminals 10 and 12 for connection to a single phase 440 volt alternating current power source, a main switch 14, a 440/110 step down transformer 16 and, a 440/4200 step up transformer assembly 18 connected to a high voltage bridge rectifier 20 (e.g. Semicon S8K3A) which is connected to a circuit including a 15 kiloohm charging resistor 22, a dump resistor 24, and three parallel 136 microfarad 5 kilovolt capacitors forming a capacitor bank 26 connected to terminals 30 and 32 through parallel mercury pool ignitrons 34 (e.g. General Electric GL7703) having ignition terminals 36, 38 and 40. A trigger circuit 42 is shown supplied by a 110 volt alternating current source with terminals 36, 38 and 40 corresponding to the mercury pool ignitor terminals.

Figure 3:
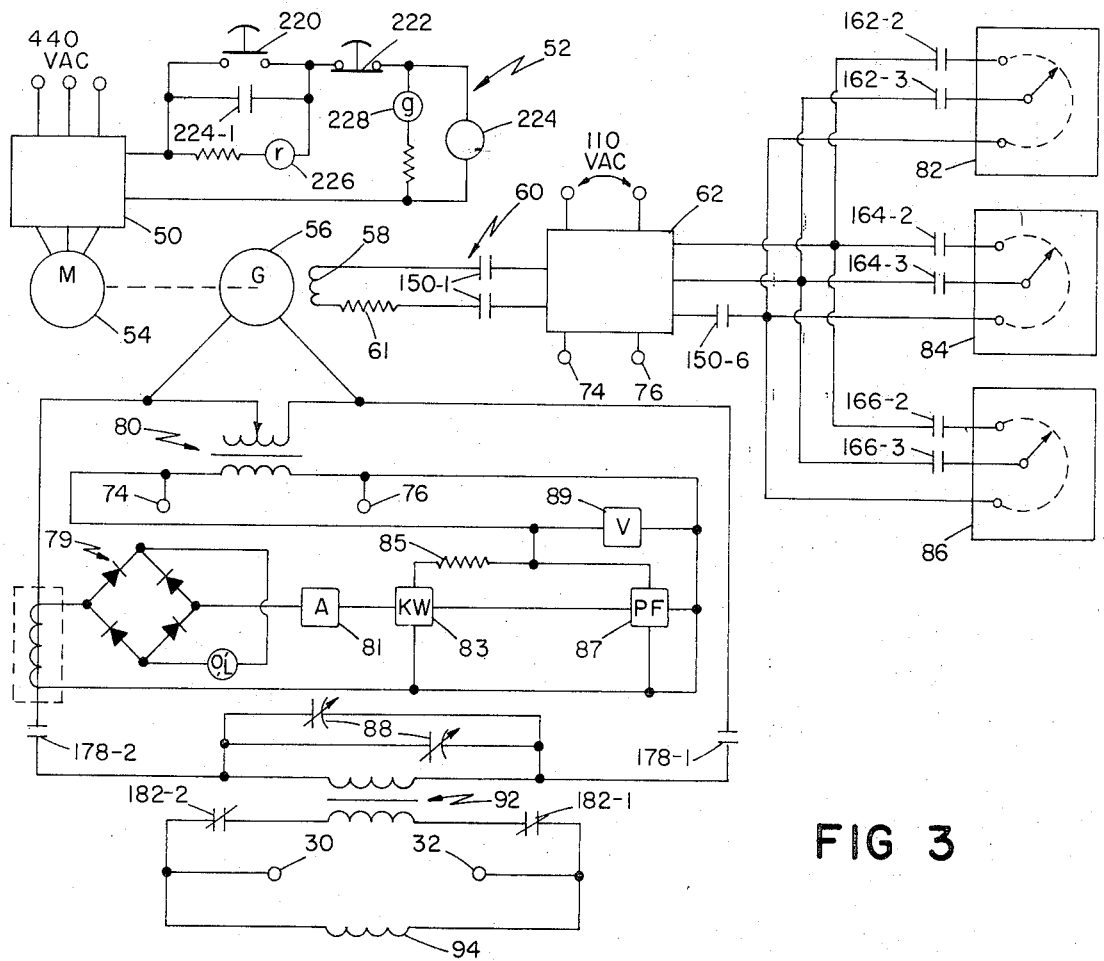
FIG. 3 is a circuit diagram of the generator circuit thereof, including the magnetic welding work coil.

Referring next to FIG. 3, there are shown a motor generator starter 50 connected to a three phase 440 volt power source not shown, a starter control circuit generally designated 52, a motor 54 connected to starter 50 drivingly connected to a 50 kilowatt, 10 kilohertz generator 56 wound to produce a 440 volt output. A generator field coil 58 is shown connected to a voltage regulating circuit 60. Circuit 60 includes via an appropriate resistor 61 a standard voltage regulated power supply 62 supplied with 110 volt alternating current which includes terminals 74 and 76 corresponding to terminals 74 and 76 on 440/220 step down transformer 80 whose primary is connected across the output of generator 56 to sense the output voltage. Voltage regulating circuit 60 further includes field adjustment rheostats 82, 84 and 86. Also shown, coupled to the generator output, are the standard metering elements, a meter bridge rectifier circuit, generally designated 79, an ammeter 81, a kilowatt meter 83, a resistance 85, a power factor meter 87, and a voltmeter 89. Included in the output circuit of the generator are adjustable water cooled 300 kvar. capacitors 88 for improving power factor. The load circuit is linked, by a transformer 92 with adjustable taps for anywhere from a 5/1 to 15/1 step down, also to improve power factor, to a load circuit including a work coil 94 in which are generated the inductive heating and magnetic pulsing currents which act upon materials to be welded in the magnetic welding process. Work coil 94 has terminals 30 and 32 which are electrically connected to terminals 30 and 32 appearing in FIG. 2.

Figure 1:
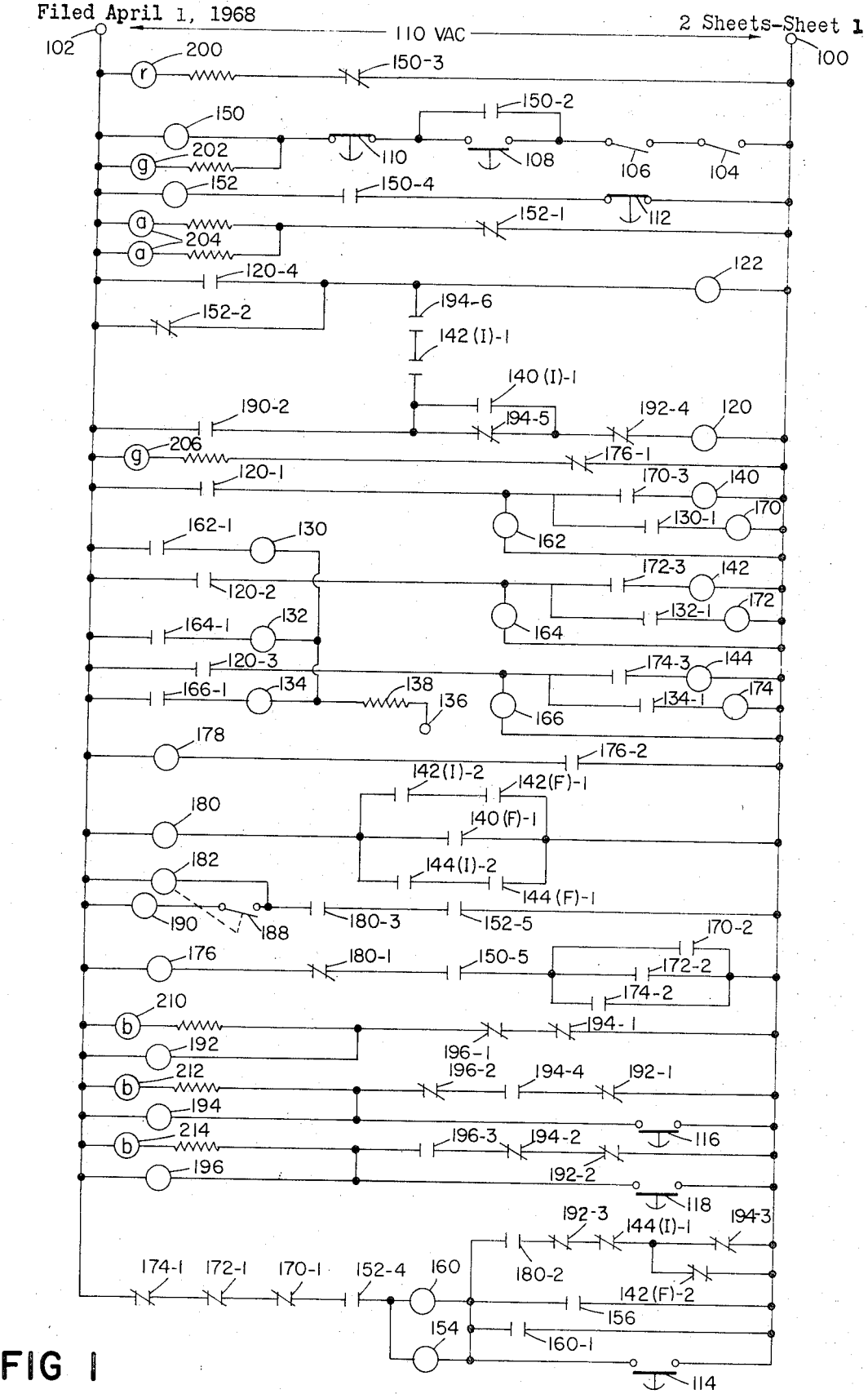
FIG. 1 is a circuit diagram of the master control circuit of the preferred embodiment of the invention.

Referring now to FIG. 1, terminals 100 and 102 are connected to the low voltage (110 volts) side of transformer 16 shown in FIG .2. A pressure switch 104 and door switch 106 are shown. A push button, normally open, "field on" switch 108 and a push button, normally closed, "field off" switch 110 are also shown. Other switches shown are an "abort" alternate on-off switch 112 and an push button, normally open, "start" switch 114. "Second mode" and "third mode" push button normally open, switches 116 and 118, repectively, are also shown. A step switch 120 is shown which controls contacts 120–1, 120–2, 120–3 and 120–4 three of which are always open. The step switch closes successively the contacts it controls whenever it receives an energizing electrical pulse, and as any contact is closed the previous one is opened. If contacts 120–1 are closed and the step switch is energized, contacts 120–2 will close and contacts 120–1 will open. A step reset switch 122 is shown. When the step reset switch is energized, the step switch reverts from whatever position it is in to the one in which contacts 120–1 are closed.

Three capacitors bank voltage meter relay coils 130, 132 and 134 are shown. The voltmeter coils control normally open contacts 130–1, 132–1 and 134–1 in the following way. When a voltmeter coil is energized it measures the voltage of the capacitor bank 26 by connection to a non-grounded terminal 136 of the capacitor bank through a suitable resistor 138 (e.g. 100 megohm). When the voltage of the capacitor bank reaches an adjustable preset level, the normally open contact controlled by the voltmeter coil is closed.

Three timer motor units 140, 142 and 144 are shown. Timer unit 140 controls contacts 140(I)–1 and 140(F)–1 (both normally open). Timer unit 142 controls contacts 142(I)–1, 142(I)–2, 142(F)–1 (all three normally open), and 142(F)–2 (normally closed). Timer unit 144 controls contacts 144(I)–1 (normally closed), 144(I)–2 and 144(F)–1 (both normally open). When timer unit 140 is energized initially, it closes contacts 140(I)–1. When an adjustable preset time after energization is finally reached, contacts 140(F)–1 are also closed. This is true for timer 142 and contacts 142(I)–1 and 142(I)–2 and contacts 142(F)–1 and 142(F)–2, respectively, as well as for timer 144 and contacts 144(I)–1 and 144(I)–2, and contacts 144(F)–1, respectively.

Several coil relays and controlled contacts are shown in the drawings, the normal position of the contacts (whether open or closed) being as shown in the drawings.

Field coil relay 150 controls contacts 150–1, –2, –3, –4, –5 and –6. (See FIG. 3 for contacts 150–1 and 150–6.) Abort coil relay 152 controls contacts 152–1, –2, –3, –4 and –5. (See FIG. 2 for contacts 152–3.) A latching coil relay 154 is shown which will close latch contacts 156 when the coil relay is initially energized. Latching coil relay 154 has the property of requiring a small current for energization. An unlatching coil relay 158 is shown in FIG. 2 which unlatches the latch switch when it is energized. A capacitor bank charge relay coil 160 controls contacts 160–1 and 160–2. Coil relays 162, 164 and 166 control contacts 162–1, –2 and –3; 164–1, –2 and –3; and 166–1, –2 and –3, respectively. Charge stop coil relays 170, 172 and 174 control contacts 170–1, –2 and –3; 172–1, –2 and –3; 174–1, –2 and –3, respectively. Coil relay 176 controls contacts 176–1 and 176–2. Heat control 178, shown in FIG. 1, controls contacts 178–1 and 178–2 in the motor generator output circuit, shown in FIG. 3. Heat stop coil relay 180 controls contacts 180–1, –2 and –3. Disconnect control 182, shown in FIG. 1, controls contacts 182–1 and 182–2 in the work coil circuit shown in FIG. 3. Disconnect control 182 is mechanically interconnected with a micro-switch 188 so that energization of control 182 results in closing of the micro-switch. Pulse coil relay 190 controls contacts 190–1 (see FIG. 2) and contacts 190–2.

Mode coil relays 192, 194 and 196 control contacts 192–1, –2, –3 and –4; 194–1, –2, –3, –4, –5 and –6; and 196–1, –2 and –3, respectively.

The control circuit shown in FIG. 1 further shows various indicating lights with the necessary associated resistors. They include a "field off" red light 200, a "field on" green light 202, amber lights 204 indicating the abort switch 112 is in the closed position, a "start" green light 206, and blue mode lights 210, 212 and 214.

Referring to motor generator start control circuit 52, as shown in FIG. 3, there are shown an "on," normally open, push button switch 220, an "off," normally closed, push button switch 222, a hold coil relay 224 controlling contacts 224–1, a red light 226 indicating when the starter is off, and a green light 228 indicating when the starter is on.

When operated, the apparatus controlled by the circuits can apply inductive heating via work coil 94 and then a magnetic pulse via the same work coil to the object to be welded three times in succession. For each sub-cycle of the operation (one heat and one pressure pulse) the rate of heating, duration of heating and magnitude of the pressure pulse may be varied, and either the heat or pressure pulse steps may be eliminated.

The operation of the control circuit will first be described for a single heat and pressure sub-cycle (a "first mode" operation). Operation begins by closing main switch 14 (see FIG. 2) which supplies power to terminals 100 and 102 of the control circuit (see FIG. 1) via transformer 16. Step reset switch 122 resets step switch 120 to a position in which contacts 120–1 are closed if it is not already in that position. The closing of contacts 120–1 energizes coil relay 162 which closes contacts 162–1, thereby allowing capacitor bank voltmeter coil 130 to read the voltage across capacitor bank 26, and closes contacts 162–2 and 162–3, putting two terminals of field adjustment rheostat 82 in the circuit of motor-generator voltage regulator circuit 60 (see FIG. 3).

If cooling water for the various water cooled parts of the device is connected pressure switch 104 will be closed and if all the doors of the cabinet in which the circuits are housed are shut door switch 106 will be closed.

The motor-generator is next started by pressing push button "on" switch 220 in motor generator start circuit 52 (shown in FIG. 3). Closing switch 220 causes hold coil relay 224 to be energized which closes contacts 224–1. Closed contacts 224–1 keep the start circuit closed when push button switch 220 is released. Red light 226 is de-energized and green light 228 energized.

Push button "field on" switch 108 is pressed, energizing "field on" green indicator light 202 and also energizing field coil relay 150. Energized field coil relay 150 closes contacts 150–1 (see FIG. 3), connecting motor-generator voltage regulator 60 to field coil 58, closes contacts 150–2 to keep the circuit energized when the "field on" button is released, opens contacts 150–3 to de-energize "field off" red indicator light 200, closes contacts 150–4 to energize abort coil relay 152, closes contacts 150–5, and closes contacts 150–6 to put the remaining terminal of field adjustment rheostat 82 in voltage regulator circuit 60.

Abort coil relay 152, energized by the closing of contacts 150–4, opens contacts 152–1, de-energizing amber lights 204, opens contacts 152–2, de-energizing step reset switch 122, opens contacts 152–3 in the capacitor bank charging circuit of FIG. 2, and closes contacts 152–4 and 152–5. (If "abort" switch 112 is opened at any time during operation, relay 152 will be de-energized and the contacts associated with it will resume their orgiinal positions, energizing amber lights 204, energizing step reset switch 122 to reset step switch 120, closing the "dump" circuit in the capacitor bank charging circuit to allow any charge accumulated by the capacitor bank to discharge through dump resistor 24, opening the circuit of "start" switch 114, and opening contacts 150–5.)

Since the first mode (one heat and one pressure only) is desired neither "second mode" nor "third mode" push buttons 116 and 118 are pushed. Therefore blue indicating light 210 and mode relay coil 192 are energized when main switch 14 is closed. Energization of relay 192 opens contacts 192–1 and 192–2 in the "second mode" and "third mode" button circuits, opens contacts 192–3, and opens contacts 192–4 in the circuit of step switch 120.

Duration of the first heating step is determined by a setting in timer unit 140; the heat rate is determined by a setting of field adjustment rheostat 82; the magnitude of the pressure pulse is determined by a setting in voltmeter coil 130 of the desired voltage of the capacitor bank at discharge.

"Start" push button 114 is then closed. Both latching coil relay 154 and capacitor charge relay coil 160 are energized. Latching coil relay 154, when energized, causes contacts 156 to close. Relay coil 160, when energized, closes contacts 160–1 to keep the circuit energized when push button 114 is released and closes contacts 160–2 to begin the charging of the capacitor bank 26 and energize unlatching coil relay 158 which opens contacts 156.

The capacitor bank charges, the voltage across the capacitors being sensed by voltmeter coil 130. When the voltage reaches the predetermined level voltmeter coil 130 closes contacts 130–1, energizing charge stop relay coil 170. Relay coil 170 then opens contacts 170–1, de-energizing capacitor charge relay coil 160 which opens contacts 160–2 to stop further charging of the capacitor bank, closes contacts 170–2 thereby energizing coil relay 176, and closes contacts 170–3, energizing timer unit 140. As explained above, initial energization of timer unit 140 causes contacts 140(I)–1 to close.

Energization of coil relay 176 causes contacts 176–1 to close thereby energizing green "start" light 206, and contacts 176–2 to close, energizing heat control 178. Heat control 178, when energized, closes contacts 178–1 and 178–2 in the output circuit of motor generator 56 (see FIG. 3), causing a high frequency voltage to be transmitted via transformer 92 to the work coil 94. The current in work coil 94 induces a current in whatever conductive material is inserted in the work coil which heats the material in preparation for the magnetic pressure pulse.

When the duration of heating reaches the preset level timer unit 140 causes contacts 140(F)–1 to close, energizing heat stop coil relay 180. Energization of coil relay 180 opens contacts 180–1, thereby de-energizing relay 176 to shut off "start" light 206 and de-energize heat control 178 which opens contacts 178–1 and 178–2 to open the motor-generator output circuit. It also closes contacts 180–2 and contacts 180–3. When contacts 180–3 are closed disconnect control 182 is energized to open contacts 182–1 and 182–2, disconnecting work coil 94 from transformer 92. Mechanically interlocked micro-switch 188 also closes, energizing pulse coil relay 190. Pulse coil relay 190, when energized, causes contacts 190–1 in trigger circuit 42 to close, triggering ignitrons 34 to connect the capacitor bank 26 to work coil 94 via terminals 30 and 32, and contacts 190–2 to close. The capacitor bank discharges through the work coil, creating a current pulse which causes magnetic fields to be generated by both the work coil and material inserted therein.

The capacitor bank discharge is sensed by voltmeter coil 130 so that contacts 130–1 to de-energize coil relay 170 which opens contacts 170–3, de-energizing timer unit 140. De-energization of timer unit 140 opens contacts 140(F)–1 to de-energize coil relay 180, thereby opening contacts 180–3 to de-energize disconnect control 182 and coil relay 190. The circuit is now in its original position just prior to pressing of "start" button switch 114.

If a heat-pressure-heat-pressure (two mode) operation is desired, "second mode" push button switch 116 is pressed. Duration of heating for first and second heats is determined by manipulation of timer units 140 and 142 respectively, heat rates by rheostats 82 and 84, and pressure magnitudes by voltmeter coils 130 and 132.

Closing switch 116 energizes light 212 and mode coil relay 194, opening contacts 194–1 to de-energize mode coil relay 192 and de-energize light 210, opening contacts 194–2 and 194–3, closing contacts 194–4 to keep relay 194 energized when button switch 116 is released, opening contacts 194–5, and closing contacts 194–6, the last two being in the step switch 120 and step reset switch 122 energization circuit.

Operation of the two mode cycle began as with the one mode cycle: pressing "start" button switch 114. The sequence of events continues as in the first operation until the point at which pulse coil relay 190 is energized. However, this time contacts 192–4, controlled by first mode coil relay 192 which was de-energized as a result of pushing "second mode" switch 116, are in their normally closed position, so that the closing of contacts 190–2 by the energization of relay 190 causes step switch 120 to be energized via contacts 190–2, 140(I)–1 and 192–4 and open contacts 120–1 and close contacts 120–2. The opening of contacts 120–1 de-energizes coil relay 162, coil relay 170 and timer unit 140. De-energization of coil relay 170 closes contacts 170–1. De-energization of coil relay 162 opens contacts 162–1 to de-energize voltmeter coil 130. De-energization of timer unit 140 causes the opening of contacts 140(F)–1 which de-energizes heat stop coil relay 180 but the sequence of operation and delay in switching is such that before coil relay 180 can cause contacts 180–2 to return to their normally open position, enough current has passed through latching coil relay 154 via closed contacts 142(F)–2, 144(I)–1, and 192–3 in addition to closed contacts 180–2 to close latch contacts 156. Latch contacts 156 closes a circuit which allows line current to pass through capacitor bank charge relay coil 160 to energize it. Charging of the capacitor bank 26 is now repeated, this time however the voltage being sensed by voltmeter coil 132. When the voltage of the capacitor bank has reached the predetermined value in this second sub-cycle charge stop coil relay 172 and timer unit 142 are energized and a second heat occurs in a controlled manner similar to the first. However in this second heating step timer unit 142 initially closes contacts 142(I)–1 and 142(I)–2, and finally (at the end of the heat duration) closes 142(F)–1 and opens 142(F)–2 so that when the capacitor bank is discharged through the work coil in the second pressure step because of the energization of pulse coil relay 190, step reset switch 122 will be energized via closed contacts 190–2, 142(I)–1 and 194–6. Energization of step reset switch 122 will open contacts 120–2 and close contacts 120–1. No energization of capacitor charge relay coil 160 is possible because both contacts 194–3 and 142(F)–2 are open.

If it is desired to eliminate the second heating step before the second pressure step this can be accomplished by setting the heat time at zero so that as soon as timer unit 142 is energized all contacts 142(I)–1, 142(I)–2, 142(F)–1, and 142(F)–2 are acted upon to keep open contacts 178–1 and 178–2 and cause the opening of contacts 182–1 and 182–2 via the various coil relay energizations.

When a three mode operation (heat and pressure, three times successively) is desired "third mode" button switch 118 is pushed closed. Closing switch 118 energizes light 214 and energizes mode coil relay 196 to open contacts 196–1, thereby de-energizing light 210 and mode coil relay 192, open contacts 196–2, and close contacts 196–3 to hold relay 196 energized when button switch 118 is released. Duration of heat, rate of heat and magnitude of pressure pulse for each sub-cycle may be set on timer units 140, 142 and 144, field rheostats 82, 84 and 86, and voltmeter coils 130, 132 and 134.

As in the two mode operation, step switch 120 is energized after the first sub-cycle of heat and pressure to open contacts 120–1 and close contacts 120–2 while capacitor bank charge relay 160 is being energized via latching coil relay 154. However step switch 120 is energized this time via closed contacts 190–2, 194–5 and 192–4 and latching coil relay 154 is energized via closed contacts 194–3, 144(I)–1, 192–3 and 180–2. After the second sub-cycle, step switch 120 is again energized to open contacts 120–2 and close contacts 120–3 and capacitor bank charge relay 160 is again energized to begin a third charging of the bank.

During the third sub-cycle, voltmeter coil 134, timer unit 144 and coil relay 174 are used. At the end of the third sub-cycle step switch 120 is again energized; this time, however, when contacts 120–3 are opened and contacts 120–4 closed the step reset switch 122 is energized to cause contacts 120–1 to be closed and contacts 120–4 opened. Energization of capacitor bank charge relay 160 via latching coil relay 154 is prevented by open contacts 144(I)–1.

For welding a socket joint in which two ¾ inch carbon steel pipes were held end to end within a ring formed of a section of 1 inch carbon steel pipe, the 1 inch pipe forming a firm electrical connection with the ¾ inch pipe ends, a two mode operation of the circuit was successfully used. During the first sub-cycle timer motor 140 was set for 25 seconds, field rheostat 82 was set at 100% and the capacitor bank voltage was set for 2500 volts on voltmeter relay coil 130. During the second sub-cycle of heat and pressure, timer 142 was set at 8 seconds, field rheostat 84 at 100% and voltmeter relay coil 132 at 1500 volts.

We claim:

1. A system for working conductive solids which comprises:
   a generator circuit adapted for connection to a work coil for causing an inductive heating current to flow in said work coil;
   a capacitor circuit adapted for connection to said work coil for causing a magnetic pulsing current to flow in said work coil;
   a master control circuit for controlling flow of said currents, said master control circuit including
      a first subcycle control circuit for controlling a first subcycle of operation of said system,
      a second subcycle control circuit for controlling a second subcycle of operation of said system, and
      a steering circuit functioning upon completion of said first subcycle automatically to initiate said second subcycle,
      each of said subcycles including flow of at least one of said inducting heating and magnetic pulsing currents in said coil.

2. The system of claim 1 in which said master control circuit includes a second subcycle go switch actuable prior to initiation of said first subcycle, and said steering circuit comprises a step switch actuable when said second subcycle go switch has been actuated upon capacitor discharge in said capacitor circuit to switch out said first subcycle control circuit and switch in said second subcycle control circuit.

3. The system of claim 2 in which said master control circuit includes a third subcycle control circuit for controlling a third subcycle of operation of said system and a third subcycle go switch actuable prior to initiatton of said first subcycle, and in which said steering circuit comprises a first branch having a normally closed first-relay controlled switch in series with said step switch, and a normally open third-relay controlled switch in parallel with a normally closed fourth-relay controlled switch, the last-mentioned two switches being also in series with said step switch in said first branch, a second branch including said step reset switch, said first and second branch each being connected at one end to one terminal of a power supply and connected at their other ends through a third branch including a normally open fifth-relay controlled switch and a second normally open fourth-relay controlled switch in series therewith, the junction of said first and third branches being connected through a normally open second-relay controlled switch to the other terminal of said power supply, said normally closed fourth-relay controlled switch being opened upon actuation of said second subcycle go switch but not upon actuation of said third subcycle go switch, said normally open third-relay controlled switch being closed upon energization of a first subcycle heating phase timer and re-opened by said step switch at the end of said first subcycle, said normally open second-relay controlled switch being closed upon the beginning of each said capacitor discharge and opened upon the completion of each said capacitor discharge, said normally closed first-relay controlled switch being opened by throwing a main power switch, but being closed if either the second or the third subcycle go switch is actuated, said second normally open fourth-relay controlled switch being closed when the other fourth-relay controlled switch mentioned opens, and said normally open fifth-relay controlled switch being closed upon energization of the second subcycle heating phase timer and re-opened by said step switch at the end of said second subcycle.

4. The system of claim 3 in which said master control circuit includes a normally open switch connected between the junction of said second and third branches and said other terminal of said power supply, said normally open switch being closed at the completion of said third subcycle.

5. The system of claim 1 in which said master control circuit includes a third subcycle control circuit for controlling a third subcycle of operation of said system, and second and third subcycle go switches, each actuable prior to initiation of said first subcycle, and said steering circuit functions upon completion of said second subcycle to automatically initiate said third subcycle, said master control circuit further including a capacitor charge energization circuit including a first branch having a normally closed first-relay controlled switch and a normally closed second relay controlled switch in parallel and a second branch having a normally closed third-relay controlled switch and a normally closed fourth-relay controlled switch in series, said first and second branches being in series, said normally closed first-relay controlled switch being opened upon actuation of said second subcycle go switch but not upon actuation of said third subcycle go switch, said normally closed second-relay controlled switch being opened at the end of the second subcycle heating phase an re-closed at the end of said second subcycle, said normally closed third-relay controlled switch being opened at the beginning of the third subcycle heating phase and re-closed at the end of said third subcycle, and said normally closed fourth-relay controlled switch being opened by throwing a main power switch, but being closed if either the second or third subcycle go switch is actuated.

6. The system of claim 5 in which said master control circuit further includes, in series with said capacitor charge energization circuit, normally closed seventh, eighth and ninth-relay controlled switches in series, said seventh-relay controlled switch bing opened at the end of capacitor charge during the first subcycle and closed during capacitor discharge, said eighth-relay controlled switch being opened at the end of capacitor charge during the second subcycle and closed during capacitor discharge, said ninth-relay controlled switch being opened at the end of capacitor charge during the third subcycle and closed during capacitor discharge.

7. The system of claim 5 further including a normally open fifth-relay controlled switch parallel to said first and second branches, and a fifth-relay in series with both said fifth-relay controlled switch and said first and second branches, and in which said second branch further includes a normally open sixth-relay controlled switch in series, said fifth-relay being energizable by a small amount of current, said sixth-relay controlled switch being closed at the end of each heating phase of each subcycle and being opened at the initiation of each capacitor discharge of each subcycle, and said fifth-relay controlled switch being closed when said fifth-relay is energized.

8. The system of claim 7 in which said capacitor circuit includes a relay which opens said sixth-relay controlled switch when said capacitor circuit is energized.

9. The system of claim 1 in which said first and second subcycle control circuits include first and second heating phase timers, respectively, each said timer having a time setting so that when said setting is reached by one of said timers said generator circuit is disengaged from said coil and said capacitor circuit is discharged through said coil.

10. The system of claim 9 in which said time settings are adjustable and may be set at zero to eliminate a heating phase.

11. The system of claim 9 in which said master control circuit includes a generator-work coil disengagement circuit which includes first and second normally open switches in parallel controlled by said first and second heating phase timers, respectively, so that when said setting is reached by one of said timers the corresponding switch is closed.

12. The system of claim 1 in which said master control circuit includes a third subcycle control circuit for controlling a third subcycle of operation of said system and a generator-work coil disengagement circuit, and said steering circuit functions upon completion of said second subcycle to automatically initiate said third subcycle, said first, second and third subcycle control circuits including first, second and third heating phase timers, respectively, having time settings, said generator-work coil disengagement circuit including first, second and third branches in parallel, said first branch including a normally open switch which is closed during the first subcycle when said first timer reaches its setting, said second branch including two normally open switches in series, one of which is closed during the second subcycle when said second timer is energized, the other of which is closed during the second subcycle when said second timer reaches its setting, said third branch including two normally open switches in series, one of which is closed during the third subcycle when said third timer is energized, the other of which is closed during the third subcycle when said third timer reaches its setting.

13. The system of claim 1 in which said generator circuit includes first and second generator field adjustable control devices, said first generator field control device determining the rate of heating during the heating phase of the first subcycle, said second generator field control device determining the rate of heating during the heating phase of the second subcycle.

14. The system of claim 13 in which said generator field adjustable control devices are rheostats.

15. The system of claim 2 in which said master control circuit further includes a step reset switch actuable at the end of said second subcycle to reset said step switch.

16. The system of claim 1 in which said first and second subcycle control circuits include first and second voltmeter relay coils, respectively.

each said voltmeter relay coil measuring, during the corresponding subcycle, the capacitor voltage in said capacitor circuit, each said voltmeter relay coil, when said capacitor voltage reaches a predetermined voltage, initiating the heating phase of the subcycle.

17. The system of claim 16 in which said predetermined voltages are adjustable.

18. The system of claim 16 in which said first voltmeter relay coil is connected across said capacitor through a normally open first-relay controlled switch and said second voltmeter relay coil is connected across said capacitor through a normally open second-relay controlled switch, said first-relay controlled switch being closed during said first subcycle, and said second-relay controlled switch being closed during said second subcycle.

19. The system of claim 1 in which said first and second subcycle control circuits each includes a first sub-circuit comprising a voltmeter relay and normally open first-relay controlled switch in series across said capacitor circuit and a second sub-circuit comprising a normally open step switch controlled switch in series with parallel first, second and third branches, said first branch including a first relay, said second branch including a heating phase timer and a normally open second-relay controlled switch in series, said third branch including a second relay and a normally open voltmeter relay-controlled switch in series, said normally open first and second relay-controlled switches being closed during energization of said first and second relays, respectively, said step switch controlled switch being closed during the appropriate subcycle operation, said voltmeter relay closing said voltmeter relay controlled switch to energize said second relay when a predetermined voltage is reached by said capacitor circuit, said heating phase timer being energized when said second relay is energized to initiate the heating phase of the appropriate subcycle.

20. The system of claim 1 in which said generator circuit contains at least one normally open first-relay controlled switch in the output circuit and at least one normally closed second-relay controlled switch in a circuit connecting the workcoil to said output circuit.

said first-relay controlled switch being closed upon the completion of said capacitor charge and opened upon completion of a heating phase, said second-relay controlled switch being opened upon completion of a heating phase and closed upon capacitor discharge.

References Cited

UNITED STATES PATENTS

| | | | |
|---|---|---|---|
| 3,205,378 | 9/1965 | Kline | 219—113 X |
| 3,267,730 | 8/1966 | Meyer et al. | 307—141 |
| 3,398,295 | 8/1968 | Fahauer | 307—141.4 |
| 3,423,560 | 1/1969 | Brennen | 219—113 X |
| 3,424,920 | 1/1969 | Jones et al. | 307—141 |

ROBERT K. SCHAEFER, Primary Examiner

T. B. JOIKE, Assistant Examiner

U.S. Cl. X.R.

219—10.75, 113